Jan. 25, 1966    R. E. McDEVITT    3,230,564
VEHICLE WINDSHIELD WASHER
Filed Dec. 16, 1963
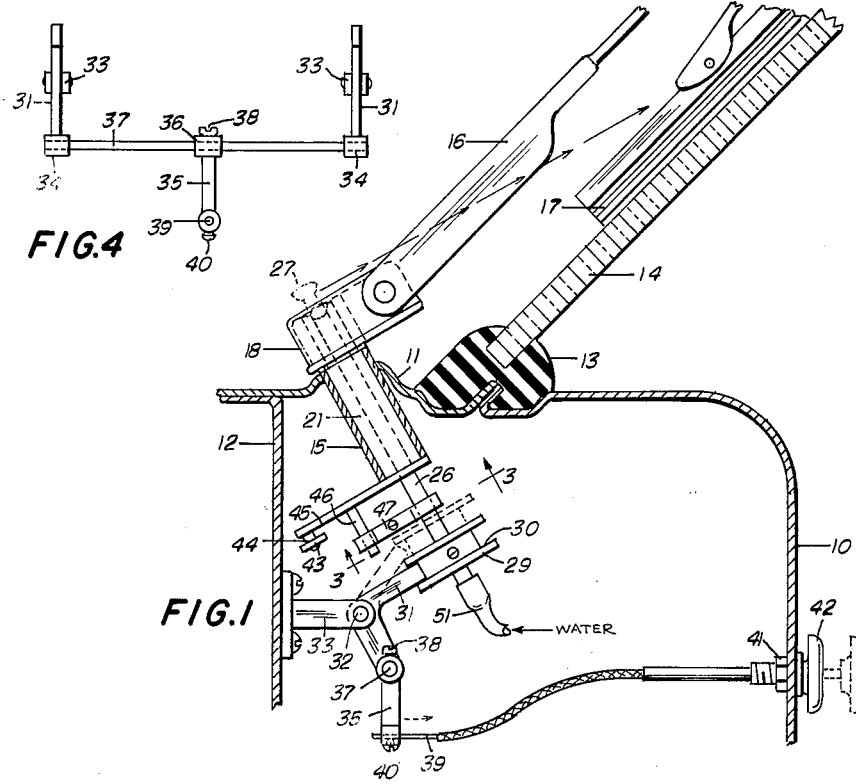
INVENTOR
ROBERT E. McDEVITT
BY *Fisher, Christen, Sabol & Caldwell*
ATTORNEYS

United States Patent Office 3,230,564
Patented Jan. 25, 1966

3,230,564
VEHICLE WINDSHIELD WASHER
Robert E. McDevitt, 509 Highland, Crawfordsville, Ind.
Filed Dec. 16, 1963, Ser. No. 330,907
16 Claims. (Cl. 15—250.04)

This invention relates to automotive accessories, and more particularly to windshield washers of the type wherein a nozzle positioned exteriorly of the body of the vehicle is arranged to direct a stream of cleaning liquid upon the windshield.

The simplest type of windshield washer used in the past comprises a closed tubular element fixedly positioned to project upwardly a short distance from the vehicle body adjacent the lower edge of the windshield. A nozzle is provided for directing the cleaning fluid upwardly onto the windshield by drilling a small opening at one side of the tubular element.

However, since there are long periods of time when the washer is not used, for most of the time the interior of the conduit is dry and the nozzle opening is unprotected, with the result that dust particles and the oily residues common to highways tend to settle in the nozzle and so clog it that when its use is necessary, it often is inoperative.

In an effort to overcome the deficiencies referred to, valve arrangements have been placed inside the tubular element for closing the nozzle when not in use. However, this type of nozzle has not been found satisfactory since it still permits dirt to accumulate in the passage between the valve and the exterior of the tube.

In the present invention, a solution has been found which involves covering the exterior of the nozzle opening when not in use, and thus completely protecting it from the possibility of contact with contamination.

Another object of the present invention is to provide a windshield washer having a protected nozzle by mounting the nozzle within an enclosure from which it can be outwardly projected for use.

A further object of the invention is to provide a dirt-free windshield washer nozzle arranged to oscillate with the wiper blade, whereby the stream of cleaning fluid will be directed adjacent the moving blade.

A still further object of the invention is to provide a windshield washer in the form of an accessory which can be attached to a conventional windshield wiper.

Yet another object of the invention is to provide a windshield washer having a nozzle capable of being projected from and retracted into a protective enclosure, wherein the actuating control is located at a remote point adjacent the vehicle operator.

Other objects and advantages will be apparent to those skilled in the art after reading the following specification in connection with the annexed drawings, in which:

FIG. 1 is a view in elevation of one form of windshield washer made in accordance with the teachings of this invention as installed on a vehicle, only a portion of the windshield and adjacent body structure being disclosed;

FIG. 2 is a view in elevation of a fragmentary portion of the nozzle, shown on an enlarged scale;

FIG. 3 is a cross-section on an enlarged scale taken on the line 3—3 of FIG. 1;

FIG. 4 is a plan view of an actuating mechanism for the nozzle mechanism as installed in a pair of windshield wipers, and;

FIG. 5 is a view in elevation of a modified form of actuating mechanism for the nozzle mechanism.

Turning now to FIG. 1, there is shown a fragmentary portion of the driver's compartment of an automobile in which the numeral 10 indicates the usual dashboard, numeral 11 indicates the cowling, and numeral 12 designates the fire wall separating the front of the driver's compartment from the engine (not shown).

Running transversely across the cowling is the usual molding 13 which surrounds the periphery of the transparent windshield 14 and secures it to the body of the vehicle.

Provided just forwardly of the molding, there is an opening in the cowling which supports a downwardly extending bushing 15. This bushing is generally arranged to extend at right angles to the plane of the windshield and supports the usual shaft for a windshield wiper arm 16 and blade 17, only a portion of which latter two elements are shown in the drawing.

The lower end of the arm 16 is pivotally connected to a hub 18 and a spring-biasing means (not shown) is provided to urge the arm and blade towards the windshield at all times. All of the foregoing structure which has just been described is conventional and no claim is made to such features in this application.

The usual hub 18 is shaped of metal in the form of an inverted cup; secured within the hub is a cylindrical fitting 19, the interior surface of which is splined as at 20. These splines are designed to frictionally engage with mating splines provided on the conventional windshield wiper drive shaft. Other means for attaching the hub to the shaft are known, and the means shown is intended to be illustrative only.

The drive shaft is usually solid, but in the present instance, a drive shaft 21 is provided, having its upper end splined, as at 22, to frictionally mate with the splines 20 and is also provided with a longitudinally extending central bore 23 which terminates at its upper end in a generally semispherical recess 24. The hub 18 will, in turn, be provided with an opening 25 forming a continuation of the recess 24.

A conduit 26, having a length somewhat longer than that of the shaft 21, is freely slidably received within the bore 23 and is closed at its upper end by a ball-shaped enlargement, or closure, 27 adapted to cooperate with the recess 24 to form a seal therewith when the conduit 26 is fully retracted. If desired, the efficiency of this seal can be improved by the provision on the ball-shaped member of an annular flexible O-ring seal 28.

Just below the ball-shaped sealing member, a radial opening 26a is provided in the conduit which, when the conduit 26 is retracted, will be completely protected against the entry of dirt and other contamination by the sealing member.

Since the usual vehicle is provided with a pair of substantially identical wipers, and since the washer attachment described herein is adaptable for use with both wipers, only one such device has, so far, been described; however, FIGS. 1 and 4 disclose a remote control mechanism for simultaneously projecting and retracting a nozzle means attached to a pair of wipers, enabling the devices to be operated from the dashboard, or any other location convenient to the operator of the vehicle.

To accomplish this purpose, the lower end of the conduit 26 is provided with a collar 29 having an annular inwardly directed recess 30 extending around its entire periphery. One end 31 of a bell crank arm is slidably received within the recess and the crank arm itself is centrally pivoted at 32 in a bracket 33 attached to the fire wall 12. The other end 34 of each crank arm receives a transversely extending rod 37. This rod supports an arm 35 at any convenient point along its length. One end of the arm 35 is provided with a boss 36 with a central bore to receive the rod 37, and is adjustably secured against rotation by a set screw 38.

The other end of the arm 35 is provided with an opening to receive the end of a control cable, such as the well known Bowden wire 39, and has a set screw 40 to adjust the position of the cable with respect to the extension. The other end of the control cable terminates in a mounting 41 positioned on the dashboard 10 and having a knob 42.

It will thus be seen that if the knob is pulled out to the dotted line position as shown in FIG. 1, the arm 35 will transmit movement to the two bell cranks through rod 37 in a counterclockwise direction to move the conduits 26 upwardly to expose the nozzles 26a for use.

While the washer mechanism would be effective to supply cleaning fluid to the windshield if the nozzle 26a did not rotate with the wiper arm, its effectiveness is increased if the stream of fluid is directed to move with the blade so as to apply the stream adjacent the arm during its oscillation.

To this end, means is provided to ensure the simultaneous oscillatory rotation of the conduit 26 with the drive shaft 21. In the usual vehicle installation, a motor (not shown) reciprocates a link 43 pivotally connected at 44 with a crank arm 45 projecting laterally from the lower end of the drive shaft 21.

The arm 45 is provided with a downwardly extending pin 46. A generally U-shaped clamp 47 has its closed end 48 formed with an inside diameter sufficient to slidingly engage with the pin 46 while its open ends 49 are compressed into tight gripping engagement on opposite sides of the conduit 26 as by means of a threaded clamping bolt 50.

It will be seen that with this arrangement, the oscillatory movement of the arm 45 will be transmitted through the medium of the pin 46 and clamp 47 to rotate the conduit 26 back and forth in synchronism with the wiper arm 16. At the same time, because the closed end 48 of the clamp is slidably received on the pin, there will be no interference with the projection and retraction of the conduit.

Cleaning fluid from the storage reservoir (not shown) is introduced to the conduit by means of a flexible tubing 51.

In FIG. 5, there is shown a modified form of projecting and retracting mechanism. In this form, a bracket 52 is mounted on the fire wall 12' to support a bushing 53, whose axis is positioned in parallel with the axis of the wiper drive shaft 21.

As in the previous example, the lower end of the conduit 26' is provided with a collar 29' having an annular recess 30'. However, bushing 53 rotatably supports a hub member 54 having a radially projecting cam plate 55. Rotation of the cam from a remote location is accomplished by means of a cable 56 which passes upwardly through a central bore in the hub and is adjustably connected to the hub as by means of the set screw 57.

As shown in FIG. 5, the conduit 26' (only a portion of which is shown) has been projected upwardly to expose the nozzle for use. However, by rotating the cam 55 through an angle of 180°, the conduit will be returned to its retracted position.

While the invention has been described as involving the modification of an existing windshield wiper of conventional construction, it will be evident that rather than require the user to modify the equipment installed at the factory, it would be possible to supply him with elements such as the hub 18, shaft 21, and arm 45 to replace the factory-installed equivalent parts; the remainder of the elements being included in a set. This procedure would enable dealers to stock a variety of sets suitable for replacement of various models of windshield wipers.

While this invention has been described, for convenience, and not by way of limitation, for use on highway vehicles, it should be further understood that it is equally adaptable for use in aircraft and railway vehicles.

Having described several modifications of the invention, it will be evident that changes and further modifications may be made by those skilled in the art which would come within the scope of the annexed claims.

I claim:

1. In windshield washers, a tubular support means positioned adjacent a windshield and extending generally at right angles to the plane thereof, conduit means slidably received within said support means and projecting from the forward end thereof, said conduit being provided with an opening in the side thereof, said conduit means being longitudinally moved to position said opening forwardly of the support means for use and to conceal it within the support means when not in use, manual control means, and connector means between said manual control means and said longitudinally movable conduit means.

2. The invention as defined in claim 1, wherein the conduit means terminates in an enlarged portion, and said support means is recessed to receive said enlarged portion in sealing engagement.

3. The invention as defined in claim 2, wherein an annular seal of yieldable material is interposed between said enlarged portion and said recess.

4. In vehicle windshield washers, a closed tube having an enlarged terminal portion positioned adjacent to a windshield and having an opening in the side thereof to direct liquid onto the windshield, a sleeve surrounding said tube, the terminal portion of the sleeve coacting with the enlarged portion of the tube to enclose said opening, said tube and sleeve being slidable with respect to each other to cover and uncover said opening, manual control means positioned adjacent the vehicle operator's station, and connector means joining said manual control means with one of said first two mentioned elements for producing said relative slidable movement.

5. The invention as defined in claim 4, wherein an annular seal of yieldable material is interposed between the terminal portions of the tube and sleeve.

6. The invention as defined in claim 4, wherein two tubes and two sleeves are positioned in spaced relation adjacent a windshield, and said actuating means includes a single manual control for said relative movement between each tube and its respective sleeve simultaneously.

7. For use in providing a vehicle windshield wiper with means to dispense liquid, the combination including, a hollow shaft for supporting a wiper blade arm, a tube slidable longitudinally in said shaft, one end of said tube having a radially enlarged portion for engagement with one end of said shaft to provide closure means for the interior of the shaft, said tube also having a radially directed orifice in communication with the interior thereof and positioned within the interior of the shaft when said closure means is effective, manual control means, and mechanical connector means between said manual control means and said slidable tube.

8. The invention as defined in claim 7, wherein said radially enlarged portion includes a semi-spherical surface, said one end of the shaft is recessed to receive said surface.

9. The invention as defined in claim 7, wherein an annular seal of yieldable material is interposed between said radially enlarged portion and said one end of the shaft.

10. The invention as defined in claim 7, wherein said combination also includes, a drive arm for rotating said shaft, and guide means connecting the drive arm and said tube for rotating the tube with the drive arm and permitting relative axial movement between the tube and said shaft.

11. The invention as defined in claim 10, wherein said guide means includes a first member secured to said tube and a second member secured to said drive arm, one of said members being an elongated element extending parallel with the axis of the tube, said second member having a portion disposed in longitudinally slidable engagement with the first member.

12. In a vehicle windshield washer, conduit means having a nozzle, support means to position the nozzle to direct liquid on a windshield, and exterior closure means relatively movable with respect to the support means for the nozzle to prevent the entry of contamination when not in use, manual control knob means positioned adjacent the vehicle operator's station, and cable means connected between said closure means and said manual control knob means.

13. The invention as defined in claim 12, wherein said support means includes oscillatory drive means for oscillatory movement of the nozzle about the axis of the conduit means, and said closure means is axially movable with respect to the support means.

14. The invention as defined in claim 13, wherein said actuating means for said relative movement includes, a radially projecting element secured to the conduit means, and an element pivotally mounted on the vehicle for slidable engagement with said projecting element.

15. The invention as defined in claim 14, wherein said pivotally mounted element is a bell crank arm having one arm in operating engagement with said radially projecting element and the other arm in operative engagement with said control knob.

16. The invention is defined in claim 14, wherein said pivotally mounted element is an axial cam, the lobe of said cam being in operative engagement with said radially projecting element, said cam being connected with said control knob for rotation thereby.

References Cited by the Examiner

UNITED STATES PATENTS

| | | | |
|---|---|---|---|
| 2,128,552 | 8/1938 | Rader et al. | 239—204 |
| 2,714,739 | 8/1955 | Neufeld | 15—250.04 |
| 2,909,325 | 10/1959 | Hunter | 239—205 |
| 3,117,727 | 1/1964 | Pollock et al. | 15—250.01 XR |

FOREIGN PATENTS

| | | |
|---|---|---|
| 430,366 | 6/1935 | Great Britain. |

CHARLES A. WILLMUTH, *Primary Examiner.*